United States Patent
Asano

(10) Patent No.: US 11,585,240 B2
(45) Date of Patent: Feb. 21, 2023

(54) EXHAUST PASSAGE

(71) Applicant: TOYOTA JIDOSHA KABUSHIKI KAISHA, Toyota (JP)

(72) Inventor: Masahiko Asano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/456,028

(22) Filed: Nov. 22, 2021

(65) Prior Publication Data

US 2022/0228508 A1    Jul. 21, 2022

(30) Foreign Application Priority Data

Jan. 19, 2021  (JP) .............................. JP2021-006364

(51) Int. Cl.
  *F01D 25/24* (2006.01)
  *F01N 13/00* (2010.01)
  *F02B 37/02* (2006.01)
  *F01N 13/10* (2010.01)

(52) U.S. Cl.
  CPC ........... *F01D 25/24* (2013.01); *F01N 13/008* (2013.01); *F01N 13/107* (2013.01); *F02B 37/025* (2013.01); *F01N 2340/06* (2013.01); *F01N 2560/025* (2013.01)

(58) Field of Classification Search
  CPC .............. F01N 13/008; F01N 2340/06; F01N 2560/025
  See application file for complete search history.

(56) References Cited

U.S. PATENT DOCUMENTS

| | | | | |
|---|---|---|---|---|
| 8,677,738 B2 * | 3/2014 | Floyd | ................... | F01N 3/2066 60/311 |
| 2008/0256927 A1 * | 10/2008 | Kikuchi | ................... | F01N 3/10 60/299 |
| 2009/0019843 A1 * | 1/2009 | Levin | ..................... | B01F 25/25 60/303 |
| 2010/0005791 A1 * | 1/2010 | Ranganathan | ........ | F01N 13/009 60/310 |
| 2015/0040537 A1 * | 2/2015 | Hicks | .................. | B01F 25/3131 60/273 |
| 2018/0334944 A1 | 11/2018 | Hideshima et al. | | |
| 2020/0123955 A1 * | 4/2020 | Liu | .......................... | F01N 3/106 |
| 2020/0408133 A1 * | 12/2020 | Burge | ................ | B01D 53/9431 |

FOREIGN PATENT DOCUMENTS

| | | |
|---|---|---|
| JP | 2014-126009 A | 7/2014 |
| JP | 2016-142145 A | 8/2016 |
| JP | 2018-193955 A | 12/2018 |
| JP | 2021-38701 A | 3/2021 |
| JP | 2021-88984 A | 6/2021 |

* cited by examiner

*Primary Examiner* — Anthony Ayala Delgado
(74) *Attorney, Agent, or Firm* — Oblon, McClelland, Maier & Neustadt, L.L.P.

(57) ABSTRACT

An exhaust passage including a protrusion which is less likely to receive heat from a gas and hence has high heat-resistance reliability is provided. An exhaust passage includes an exhaust pipe, and a protrusion continuously formed over a range of a part of an inner surface of the exhaust pipe in a circumferential direction thereof, the protrusion being inclined toward a direction in which the exhaust pipe extends, and being configured in such a manner that a cross-sectional area of the exhaust pipe becomes smaller toward a downstream side thereof, in which the exhaust passage further includes a convex part on an inner surface of the protrusion.

4 Claims, 10 Drawing Sheets

EXHAUST PASSAGE

CROSS REFERENCE TO RELATED APPLICATIONS

This application is based upon and claims the benefit of priority from Japanese patent application No. 2021-006364, filed on Jan. 19, 2021, the disclosure of which is incorporated herein in its entirety by reference.

BACKGROUND

The present disclosure relates to a structure of an exhaust passage.

A sensor for detecting the concentration of oxygen (hereinafter also referred to as an oxygen concentration) and the like in an exhaust gas is provided in an exhaust pipe of an internal combustion engine. When the operation of such an internal combustion engine is controlled, for example, the amount of intake air and the amount of injected fuel are adjusted according to the detected oxygen concentration, so that the air-fuel ratio is controlled.

An exhaust gas discharged from each cylinder in the engine passes through an exhaust manifold and flows into one exhaust pipe. The flow of the exhaust gas is highly directional toward the downstream direction, so the gas tends to be unevenly distributed on the cross section of the exhaust pipe. Therefore, the issue of providing a mechanism for stirring an exhaust gas before it reaches a sensor has been studied.

Japanese Unexamined Patent Application Publication No. 2016-142145 discloses, as a method for forming uniformly distributed exhaust while cooling the flowing exhaust, a specific exhaust pipe including an outer protrusion and an inner protrusion.

Japanese Unexamined Patent Application Publication No. 2018-193955 discloses, as a method for uniformly blowing exhaust discharged from each cylinder onto an exhaust sensor, providing a convex guide part on the upstream side of an exhaust sensor.

Further, Japanese Unexamined Patent Application Publication No. 2014-126009 discloses providing a protrusion with a hole formed therein between first and second exhaust pipes. According to Japanese Unexamined Patent Application Publication No. 2014-126009, when exhaust passes near the protrusion, its flow becomes turbulent, so that the exhaust is diffused.

SUMMARY

There are cases in which the temperature of a gas flowing through an exhaust pipe exceeds 800° C. When a high-temperature gas flows through the exhaust pipe including the protrusion disclosed in Japanese Unexamined Patent Application Publication No. 2014-126009, the closer a point is to the tip of the protrusion, the smaller the amount of the discharged heat becomes. As a result, the closer a point is to the tip of the protrusion, the higher the temperature becomes as shown in an example shown in FIG. 9. In this state, a difference between the temperature of the base of the protrusion and that of the tip thereof increases, so that large thermal stresses are exerted on parts of the protrusion as shown in FIG. 10. As a result, there is a possibility that the protrusion could be deformed or broken.

The present disclosure has been made to solve the above-described problem, and an object thereof is to provide an exhaust passage including a protrusion which is less likely to receive heat from a gas and hence has high heat-resistance reliability.

A first exemplary aspect is an exhaust passage including:
an exhaust pipe; and
a protrusion continuously formed over a range of a part of an inner surface of the exhaust pipe in a circumferential direction thereof, the protrusion being inclined toward a direction in which the exhaust pipe extends, and being configured in such a manner that a cross-sectional area of the exhaust pipe becomes smaller toward a downstream side thereof, in which
the exhaust passage further includes a convex part on an inner surface of the protrusion.

According to an aspect of the above-described exhaust passage,
the convex part is a linear convex part, and
a plurality of convex parts are arranged with an interval therebetween in the direction in which the exhaust pipe extends.

According to an aspect of the above-described exhaust passage, the convex part is provided in a part of the protrusion where a thermal stress is exerted on the protrusion.

According to an aspect of the above-described exhaust passage, a plurality of convex parts are arranged in a staggered pattern.

According to the present disclosure, it is possible to provide an exhaust passage including a protrusion which is less likely to receive heat from a gas and hence has high heat-resistance reliability.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

The present disclosure will be explained hereinafter through embodiments according to the present disclosure.

However, the below-shown embodiments are not intended to limit the scope of the present disclosure specified in the claims. Further, for clarifying the explanation, the following description and drawings are simplified as appropriate. Note that, in this specification, an X-axis is defined in the downstream direction in the axial direction of the exhaust pipe (the direction in which the exhaust pipe extends, hereinafter also referred to as the extending direction of the exhaust pipe), and a plane perpendicular to the X-axis is referred to as (i.e., defined as) a YZ-plane (also referred to simply as a cross section).

Figure 1:
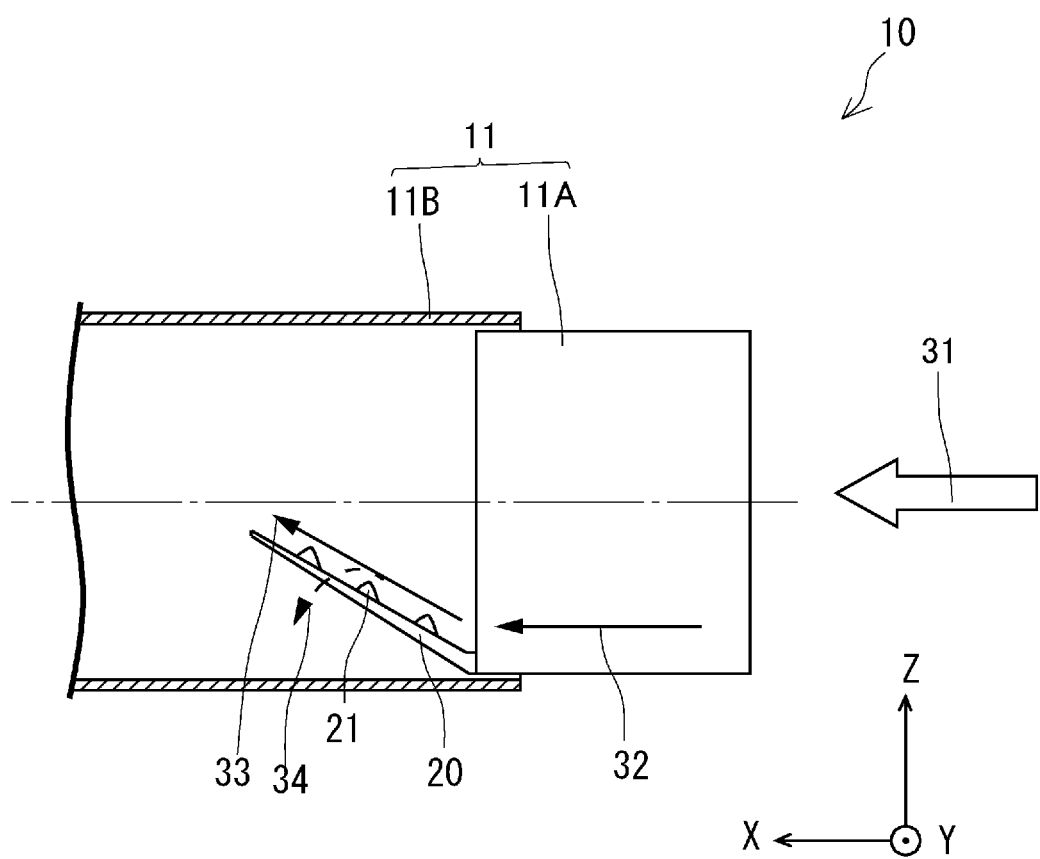
FIG. 1 is a schematic diagram showing an example of an exhaust passage according to the present disclosure.

An exhaust passage 10 shown in the example shown in FIG. 1 is an exhaust passage that is suitably used in an internal combustion engine, and includes an exhaust pipe 11 (exhaust pipes 11A and 11B), and a protrusion 20, and also includes convex parts 21 on the inner surface of the protrusion 20.

Figure 2:
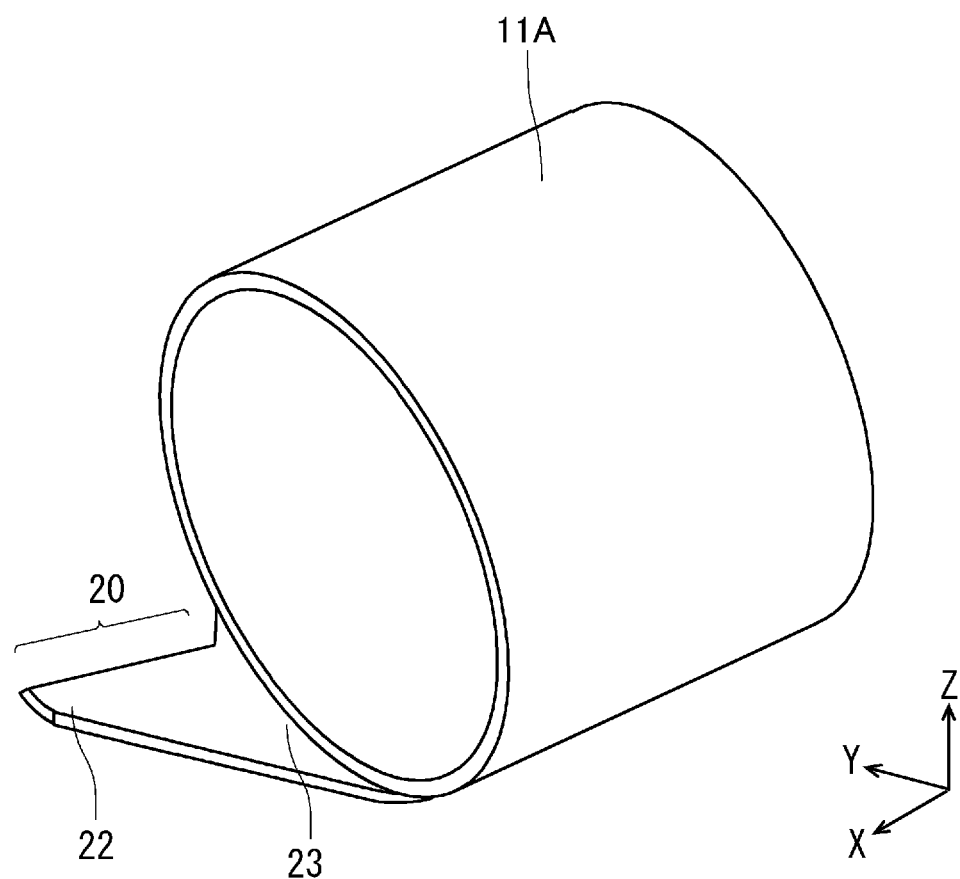
FIG. 2 is a schematic diagram of an example of a protrusion.

As shown in FIG. 2, the protrusion 20 is inclined toward the central-axis direction of the exhaust pipe, and has a tapered shape from a base end 23 of the protrusion 20 toward a tip 22 thereof. The base end 23 of the protrusion is connected to the exhaust pipe 11A. The protrusion 20 and the exhaust pipe 11A may be connected by welding, or they may be integrally molded. Note that the illustration of the convex parts 21 is omitted in FIG. 2.

The exhaust pipe 11A shown in FIG. 1 may be connected to another pipe (not shown) on the upstream side thereof. Further, an air-fuel ratio sensor (not shown) is disposed on the downstream side of the exhaust pipe 11B.

In FIG. 1, a gas 31 flows in the X-axis direction. Note that, in the exhaust passage including the protrusion 20, a part of the exhaust gas 32 hits the protrusion 20 and flows 33 along the protrusion 20. Because the protrusion 20 has the tapered shape, a part of the gas 34 comes off the protrusion as it flows downstream, so that an airflow indicted by a dashed-line arrow is formed. This airflow is continuously formed over the entire area of the protrusion 20 and becomes a swirling flow, and the gas is further stirred throughout the inside of the pipe even after the airflow has passed through the protrusion 20. As a result, the surface uniformity of the gas is improved, and therefore the accuracy of the measurement by the sensor is improved. Further, the exhaust passage according to this embodiment has a relatively large opening (i.e., a large mouth) even at the place thereon where the protrusion 20 is provided. Further, the above-described swirling flow spreads throughout the inside of the pipe, so it is possible to prevent or reduce an increase in the pressure loss.

Figure 9:
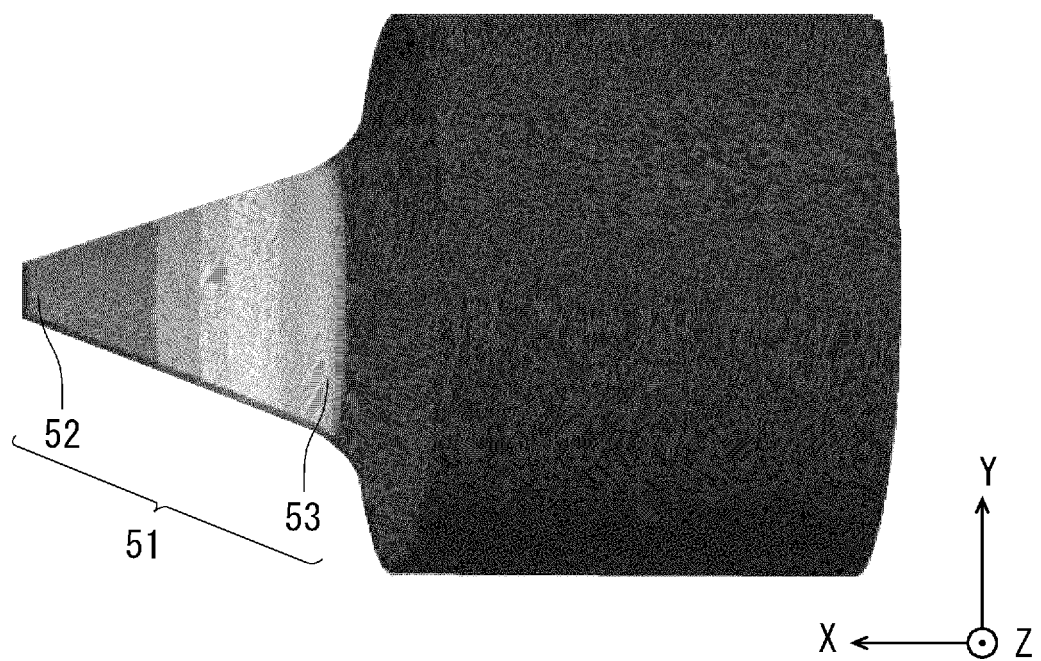
FIG. 9 shows temperatures of a protrusion according to related art.
Figure 10:
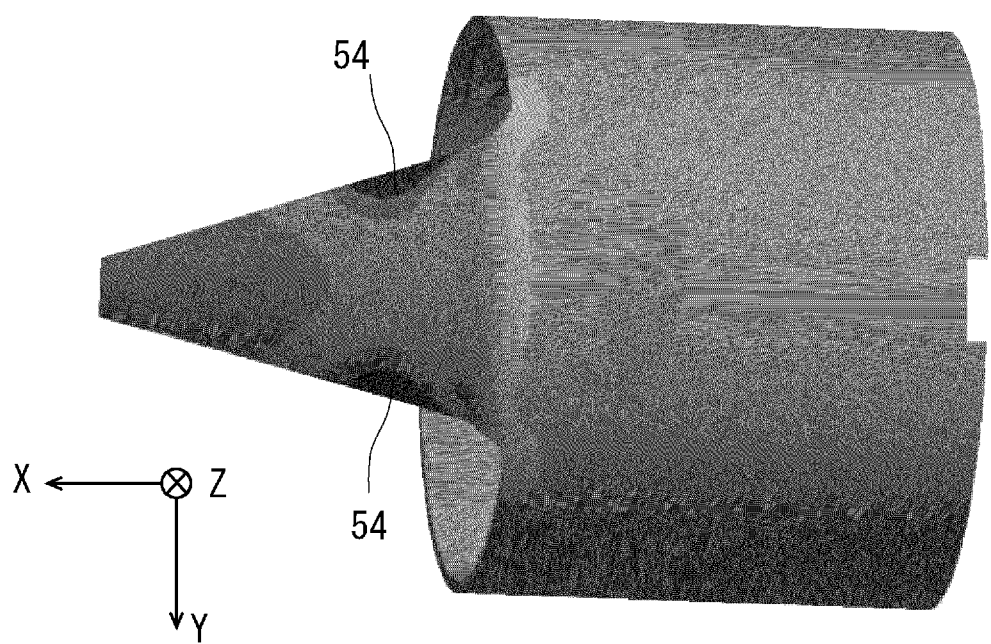
FIG. 10 shows magnitudes of thermal stresses exerted on a protrusion according to related art.

There are cases in which the temperature of the exhaust gas 31 exceeds 800° C. FIG. 9 shows temperatures of a protrusion 51 not including any convex part 21 when a gas having a temperature of 800° C. flows around the protrusion 51. The base end 53 of the protrusion 51 is close to the exhaust pipe 11 and heat tends to be dissipated therefrom, whereas heat cannot be dissipated from the tip 52. Therefore, the tip 52 has a higher temperature than that of the base end 53, and a large temperature gradient occurs between the tip 52 and the base end 53. As a result, thermal stresses occur as shown in FIG. 10, and a maximum thermal stress area 54 is formed near the base end 53, causing a thermal deformation and/or a thermal creep rupture.

Figure 3:
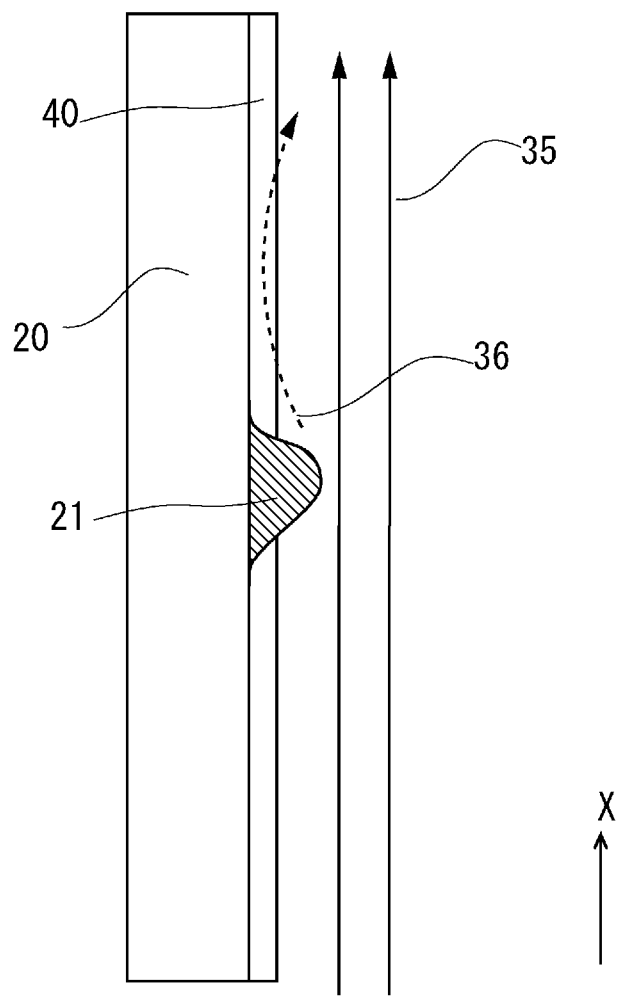
FIG. 3 is a schematic diagram for explaining a flow of gas.

The exhaust passage according to the embodiment solves the above-described problem by providing the convex parts 21 on the inner surface of the protrusion 20. As shown in the example shown in FIG. 3, the gas 35 tends to flow in a straight line, so it does not flow as indicated by a dashed-line arrow 36 even though the convex part 21 is present, but instead flows straight along near the central axis of the exhaust pipe. Therefore, in the protrusion 20 including the convex parts 21, an area which the high-temperature gas is unlikely to enter is formed, so that a boundary insulation layer 40 is formed. As a result, the high-temperature gas is less likely to come into contact with the base material of the protrusion 20. Due to the above-described features, the exhaust passage according to the embodiment becomes an exhaust passage including a protrusion which is less likely to receive heat from a gas and hence has high heat-resistance reliability.

Preferred embodiments will be described hereinafter.

First Embodiment

Figure 4:
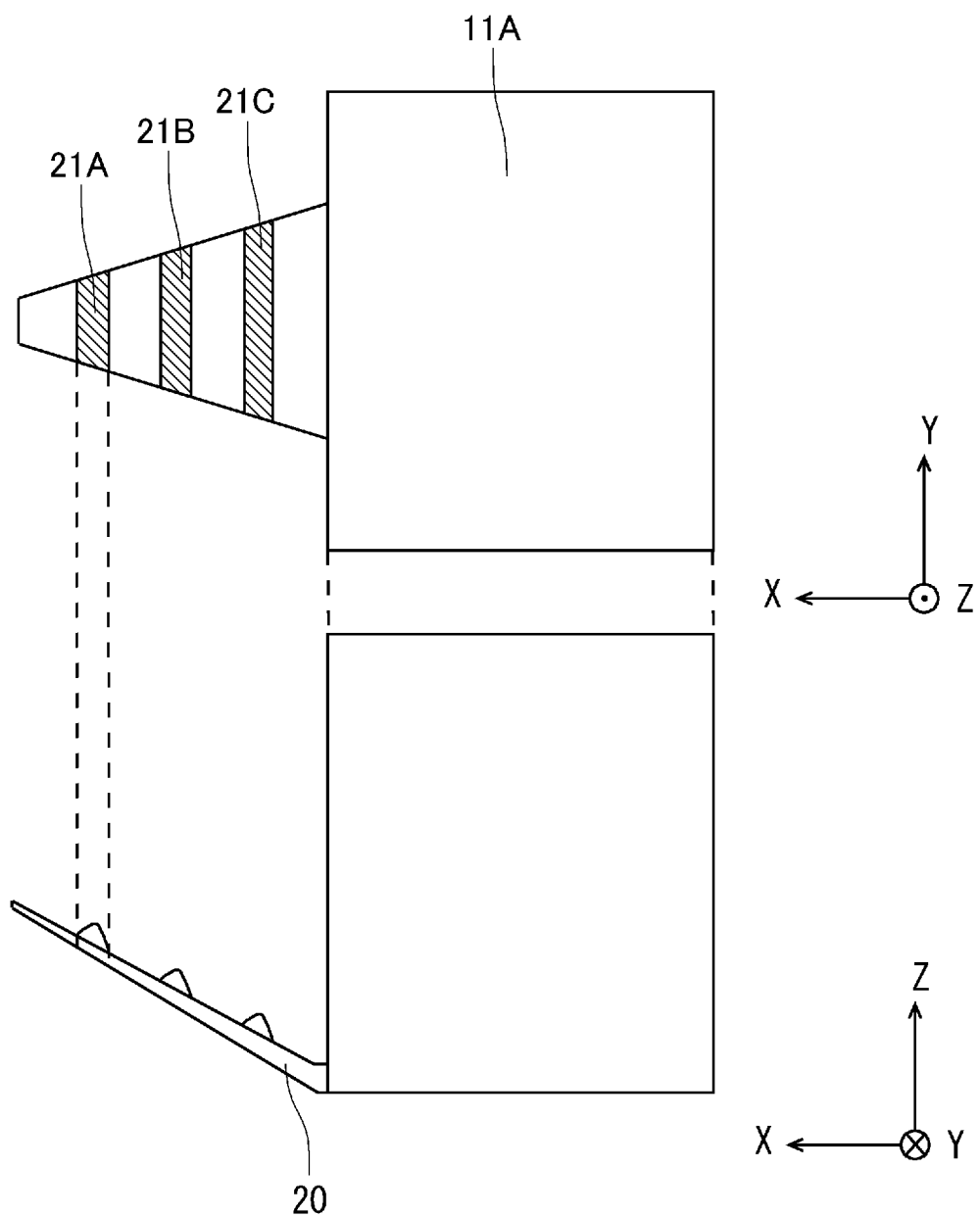
FIG. 4 is a schematic top view and a schematic side view showing an example of a protrusion of an exhaust passage according to a first embodiment.

An exhaust passage according to a first embodiment will be described with reference to FIG. 4. The exhaust passage 10 according to the first embodiment includes an exhaust pipe 11, a protrusion 20, and also includes convex parts 21 on the inner surface of the protrusion 20. Further, the convex parts 21 are linear convex parts (21A, 21B and 21C), and these convex parts are arranged with intervals therebetween in the extending direction of the exhaust pipe.

Figure 5:
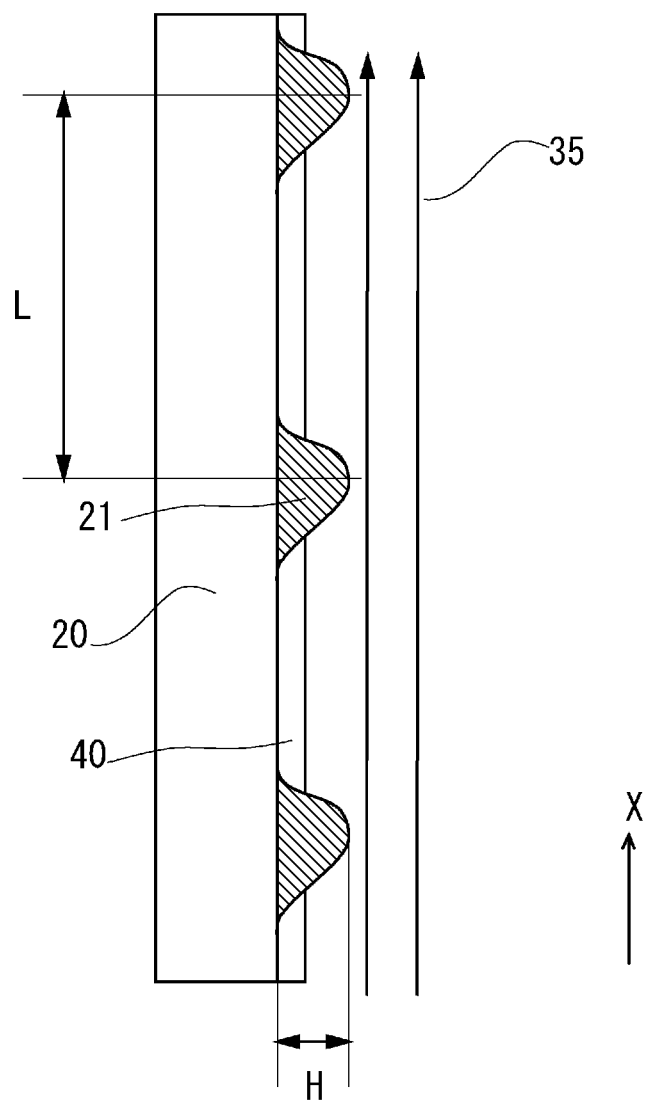
FIG. 5 is a schematic diagram for explaining a flow of gas in the first embodiment.

By providing a plurality of convex parts 21 as shown in FIG. 5, the gas 35 flows straight through an area that is closer to the central axis than the apexes of the convex parts are (i.e., an area between the apexes of the convex parts and the central axis), so that the protrusion is even less likely to receive heat.

The intervals L between adjacent ones of the plurality of convex parts 21 may be constant, or may vary from one interval to another. The intervals L between adjacent convex parts are preferably 10 mm or shorter in order to improve the effect of preventing the gas from coming into direct contact with the base material of the protrusion 20. Meanwhile, the lower limit of each of the intervals L between adjacent convex parts is not limited to any particular value, but as an example, it is 1 mm or longer.

Further, the height H of the convex part 21 is preferably 2 mm or larger in order to prevent the peeling of the boundary insulation layer which would otherwise be caused by the Karman vortex. By preventing the peeling of the boundary insulation layer which would otherwise be caused by the Karman vortex, the boundary insulation layer 40 is stabilized. The upper limit of the height H of the convex part 21 is not limited to any particular values, but as an example, it is 10 mm or smaller.

The method for forming linear convex parts is not limited to any particular methods, but they can be easily formed, for example, by welding.

Second Embodiment

Figure 6:
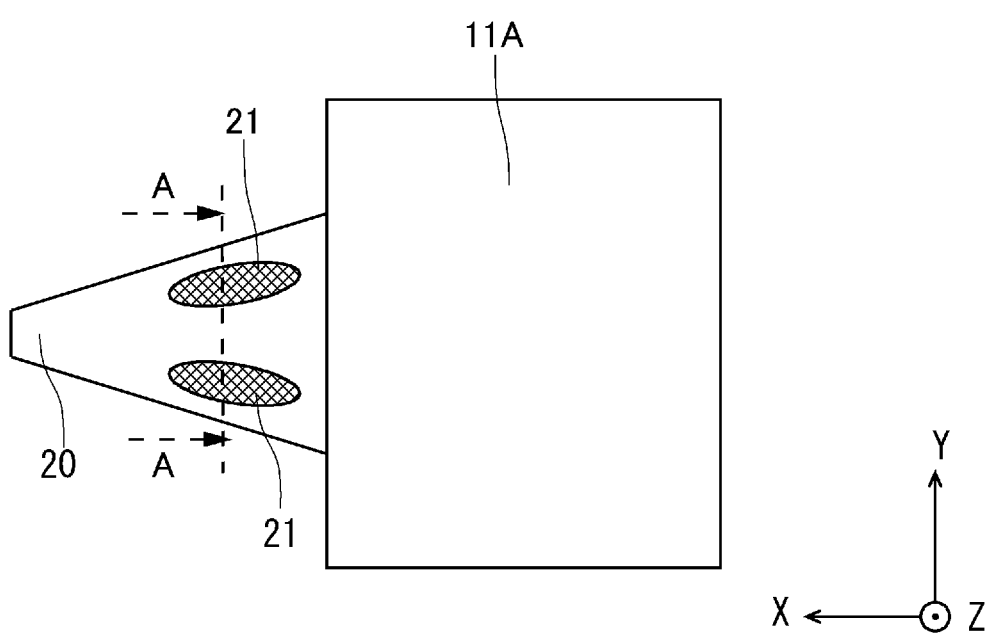
FIG. 6 is a schematic bottom view showing an example of a protrusion of an exhaust passage according to a second embodiment.

An exhaust passage according to a second embodiment will be described with reference to FIG. 6. The exhaust passage 10 according to the second embodiment includes an exhaust pipe 11, a protrusion 20, and also includes convex parts 21 on the inner surface of the protrusion 20. Further, the convex parts 21 are disposed in parts where thermal stresses are exerted on the protrusion.

Figure 7:
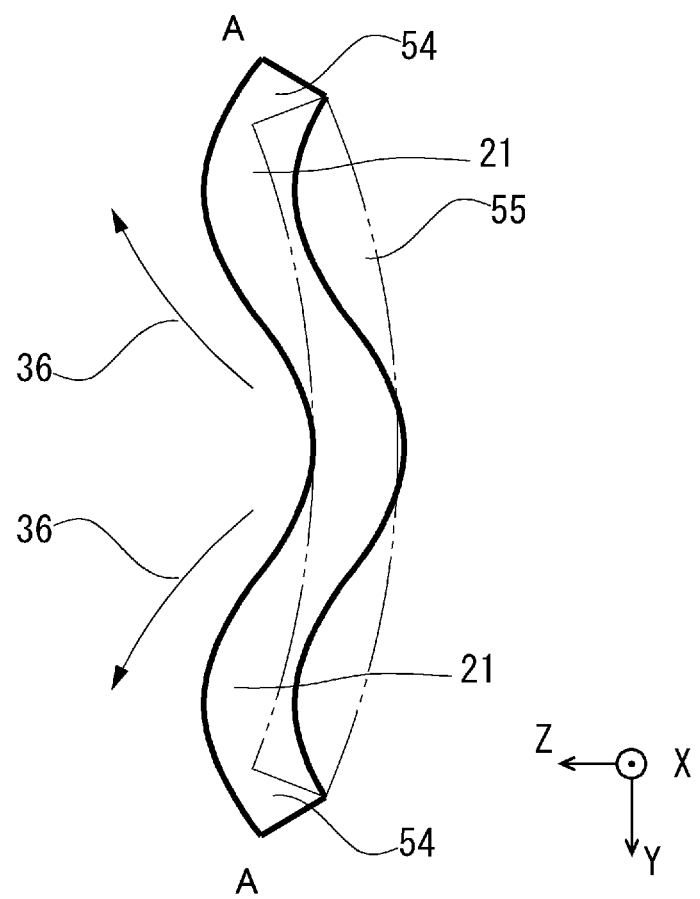
FIG. 7 is a cross-sectional view taken along a line A-A in FIG. 6.

By providing the convex parts 21 in the parts where thermal stresses are exerted as shown in FIG. 7, it is possible to prevent a gas 36 having a high temperature from hitting the (maximum) thermal stress area 54.

The method for forming convex parts according to the second embodiment is not limited to any particular methods, but they can be easily formed, for example, by bending.

Third Embodiment

Figure 8:
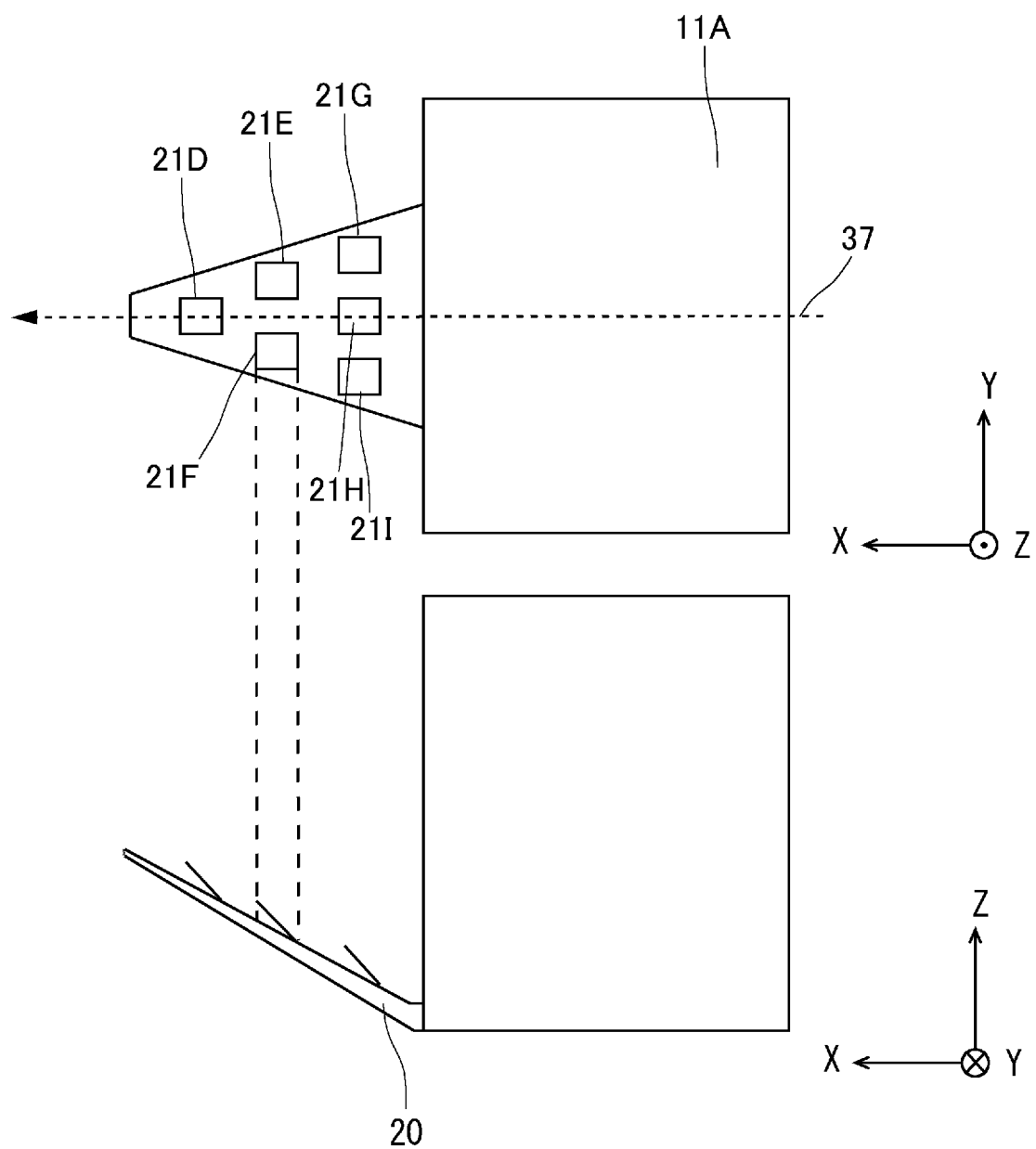
FIG. 8 is a schematic top view and a schematic side view showing an example of a protrusion of an exhaust passage according to a third embodiment.

An exhaust passage according to a third embodiment will be described with reference to FIG. 8. The exhaust passage 10 according to the third embodiment includes an exhaust pipe 11, a protrusion 20, and also includes convex parts 21D to 21I on the inner surface of the protrusion 20. Further, these convex parts are arranged in a staggered pattern.

By providing the convex parts in a staggered pattern, a plurality of convex parts, e.g., the convex parts 21D and 21H, are arranged in a gas flow direction 37. By providing a plurality of convex parts, e.g., the convex parts 21D and 21H, in the gas flow direction, similarly to the first embodiment, the gas flows straight through an area that is closer to the central axis than the apexes of the convex parts are (i.e., an area between the apexes of the convex parts and the central axis), so that the protrusion is less likely to receive heat.

The interval L between convex parts (e.g., the interval between the convex parts 21D and 21H) in the gas flow direction is preferably 10 mm or shorter. Meanwhile, the lower limit of the interval L between convex parts is not limited to any particular values, but as an example, it is 1 mm or longer.

Further, the height H of the convex part 21 is preferably 2 mm or larger in order to prevent the peeling of the boundary insulation layer which would otherwise be caused by the Karman vortex. By preventing the peeling of the boundary insulation layer which would otherwise be caused by the Karman vortex, the boundary insulation layer is stabilized. The upper limit of the height H of the convex part 21 is not limited to any particular values, but as an example, it is 10 mm or smaller.

The method for forming convex parts in a staggered pattern is not limited to any particular methods, but they can be formed, for example, by punching out the base material so that parts on the base end side are left, and then performing bending and shaping.

Each of the exhaust passages according to the above-described first to third embodiments includes a protrusion which provides a high stirring effect while preventing or reducing the pressure loss as described above, is less likely to receive heat from a gas, and has high heat-resistance reliability. Therefore, the exhaust passage according to the embodiment can be suitably used, for example, as an exhaust passage of an internal combustion engine. Further, the protrusion used in the exhaust passage according to the embodiment is formed as a single piece and has a relatively simple structure, so it is highly reliable and can be manufactured at a low cost.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An exhaust passage comprising:
   an exhaust pipe; and
   a protrusion continuously formed over a range of a part of an inner surface of the exhaust pipe in a circumferential direction thereof, the protrusion being inclined toward a direction in which the exhaust pipe extends, and the protrusion configured in such a manner that a cross-sectional area of the exhaust pipe becomes smaller toward a downstream side thereof, wherein
   the exhaust passage further comprises a convex part on an inner surface of the protrusion.

2. The exhaust passage according to claim 1, wherein
   the convex part is a linear convex part, and
   a plurality of convex parts are arranged with an interval therebetween in the direction in which the exhaust pipe extends.

3. The exhaust passage according to claim 1, wherein the convex part is provided in a part of the protrusion where a thermal stress is exerted on the protrusion.

4. The exhaust passage according to claim 1, wherein a plurality of convex parts are arranged in a staggered pattern.

* * * * *